(12) United States Patent
Lovric et al.

(10) Patent No.: US 9,170,996 B2
(45) Date of Patent: Oct. 27, 2015

(54) CONTENT INTERCHANGE BUS

(71) Applicant: BANK OF AMERICA CORPORATION, Charlotte, NC (US)

(72) Inventors: Steven Lovric, Thousand Oaks, CA (US); Jitendra Bhimavarapu, Chicago, IL (US); Matthias von Rueden, Northbrook, IL (US)

(73) Assignee: Bank of America Corporation, Charlotte, NC (US)

( * ) Notice: Subject to any disclaimer, the term of this patent is extended or adjusted under 35 U.S.C. 154(b) by 159 days.

(21) Appl. No.: 13/896,062

(22) Filed: May 16, 2013

(65) Prior Publication Data

US 2014/0344327 A1 Nov. 20, 2014

(51) Int. Cl.
*G06F 15/16* (2006.01)
*G06F 17/30* (2006.01)
*H04L 29/08* (2006.01)
*G06Q 30/00* (2012.01)

(52) U.S. Cl.
CPC .............. *G06F 17/30* (2013.01); *G06Q 30/00* (2013.01); *H04L 67/2804* (2013.01)

(58) Field of Classification Search
CPC .............. H04L 67/42; G06F 17/30–17/30011
USPC .................................. 709/203, 213, 214, 219
See application file for complete search history.

(56) References Cited

U.S. PATENT DOCUMENTS

| | | | |
|---|---|---|---|
| 6,564,307 B1 * | 5/2003 | Micka et al. .................. 711/156 |
| 8,234,372 B2 | 7/2012 | Knapp et al. |
| 8,260,913 B2 | 9/2012 | Knapp et al. |
| 8,306,948 B2 | 11/2012 | Chou et al. |
| 8,341,363 B2 | 12/2012 | Chou et al. |
| 8,392,838 B2 | 3/2013 | Chawla et al. |
| 8,892,677 B1 * | 11/2014 | Grove et al. .................. 709/213 |
| 2005/0063526 A1 * | 3/2005 | Smith ..................... 379/207.11 |
| 2007/0078853 A1 * | 4/2007 | Shutt ................................. 707/8 |
| 2008/0201747 A1 * | 8/2008 | Cooper .......................... 725/93 |
| 2010/0191783 A1 | 7/2010 | Mason et al. |
| 2010/0287219 A1 | 11/2010 | Caso et al. |
| 2010/0333116 A1 | 12/2010 | Prahlad et al. |
| 2011/0191425 A1 * | 8/2011 | Brodeur et al. ............... 709/206 |
| 2011/0225229 A1 * | 9/2011 | Srivastava et al. ............ 709/203 |
| 2011/0252071 A1 | 10/2011 | Cidon |
| 2012/0084261 A1 | 4/2012 | Parab |
| 2012/0096368 A1 | 4/2012 | McDowell |
| 2012/0150881 A1 | 6/2012 | Cho et al. |
| 2012/0203742 A1 | 8/2012 | Goodman et al. |
| 2012/0317164 A1 | 12/2012 | Zhou |
| 2013/0097275 A1 * | 4/2013 | Wofford et al. ............... 709/213 |
| 2013/0144845 A1 * | 6/2013 | Ghuge et al. .................. 707/692 |
| 2013/0218845 A1 * | 8/2013 | Kleppner et al. ............. 707/687 |
| 2013/0219140 A1 * | 8/2013 | Hanson et al. ................ 711/162 |
| 2014/0304836 A1 * | 10/2014 | Velamoor et al. ............... 726/28 |

* cited by examiner

*Primary Examiner* — Brendan Higa
(74) *Attorney, Agent, or Firm* — Michael A. Springs; Moore & Van Allen PLLC; Peter B. Stewart

(57) ABSTRACT

Disclosed is a content interchange bus that is configured for (i) receiving a first content creation request from a client, the first content creation request including a first content object that includes data intended for distribution, a first metadata name/value pair describing the first content object, and a second metadata name/value pair describing a first content container; (ii) creating the first content container in the cloud storage platform; (iii) storing the first content object in the cloud storage platform; (iv) receiving a first message from the client, the first message including the first content container's uniform resource identifier and/or the first content object's uniform resource identifier, the message including a topic string that includes a first routing string; and (v) routing the first message to a first subscriber based at least partially on the topic string including the first routing string.

21 Claims, 4 Drawing Sheets

CONTENT INTERCHANGE BUS

FIELD OF THE INVENTION

The present invention embraces a system for exchanging content via messages. The system typically includes a content interchange bus for routing messages. Messages may include one or more pointers to content stored in a cloud storage platform. These pointers may then be used to retrieve content from the cloud storage platform.

BACKGROUND

In many business transactions it is often necessary to exchange large amounts of structured and/or unstructured data. For example, in the mortgage industry many documents must be completed and/or provided as part of the loan application process. In electronic form, the total size of these documents can be substantial (e.g., several gigabytes). Various messaging systems can provide for the exchange of documents, however, these messaging systems typically allow for limited message payloads and, thus, are typically inadequate for large content transfers (e.g., due to large documents and/or a large volume of documents). Accordingly, a need exists for an improved way of transferring large content between parties.

SUMMARY

In one aspect, the present invention embraces a system for exchanging content via messages. The system typically includes a content interchange bus that includes a processor, a memory, and a messaging module stored in the memory and executable by the processor. The messaging module is typically configured for receiving a first content creation request from a client, the first content creation request including a first content object that includes (i) data intended for distribution, (ii) a first metadata name/value pair describing the first content object, and (iii) a second metadata name/value pair describing a first content container. The messaging module is typically configured for creating the first content container in a cloud storage platform, the first content container defining a uniform resource identifier indicating its location in the cloud storage platform, and storing the first content object in the cloud storage platform, the first content object defining a uniform resource identifier indicating its location in the cloud storage platform. The messaging is also typically configured for storing a subscription list, the subscription list associating a first subscriber with a first routing string.

Subsequently, the messaging module receives a first message from the client. The first message typically includes the first content container's uniform resource identifier and/or the first content object's uniform resource identifier. The message also typically includes a topic string that includes the first routing string. Based at least partially upon the topic string including the first routing string, the messaging module routes the first message to the first subscriber. Later, the messaging module receives a first content retrieval request from the first subscriber, the first content retrieval request including the first content container's uniform resource identifier and/or the first content object's uniform resource identifier. Based at least partially upon the first content retrieval request including the first content container's uniform resource identifier and/or the first content object's uniform resource identifier, the messaging module provides a copy of the first content object to the first subscriber.

In another aspect, the present invention embraces a method for exchanging content via messages. The method typically includes: receiving a first content creation request from a client, the first content creation request including a first content object that includes (i) data intended for distribution, (ii) a first metadata name/value pair describing the first content object, and (iii) a second metadata name/value pair describing a first content container; creating the first content container in a cloud storage platform, the first content container defining a uniform resource identifier indicating its location in the cloud storage platform; storing the first content object in the cloud storage platform, the first content object defining a uniform resource identifier indicating its location in the cloud storage platform; storing a subscription list, the subscription list associating a first subscriber with a first routing string; receiving a first message from the client, the first message including the first content container's uniform resource identifier and/or the first content object's uniform resource identifier, the message including a topic string that includes the first routing string; routing the first message to the first subscriber based at least partially on the topic string including the first routing string; receiving a first content retrieval request from the first subscriber, the first content retrieval request including the first content container's uniform resource identifier and/or the first content object's uniform resource identifier; and providing a copy of the first content object to the first subscriber based at least partially upon the first content retrieval request including the first content container's uniform resource identifier and/or the first content object's uniform resource identifier.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
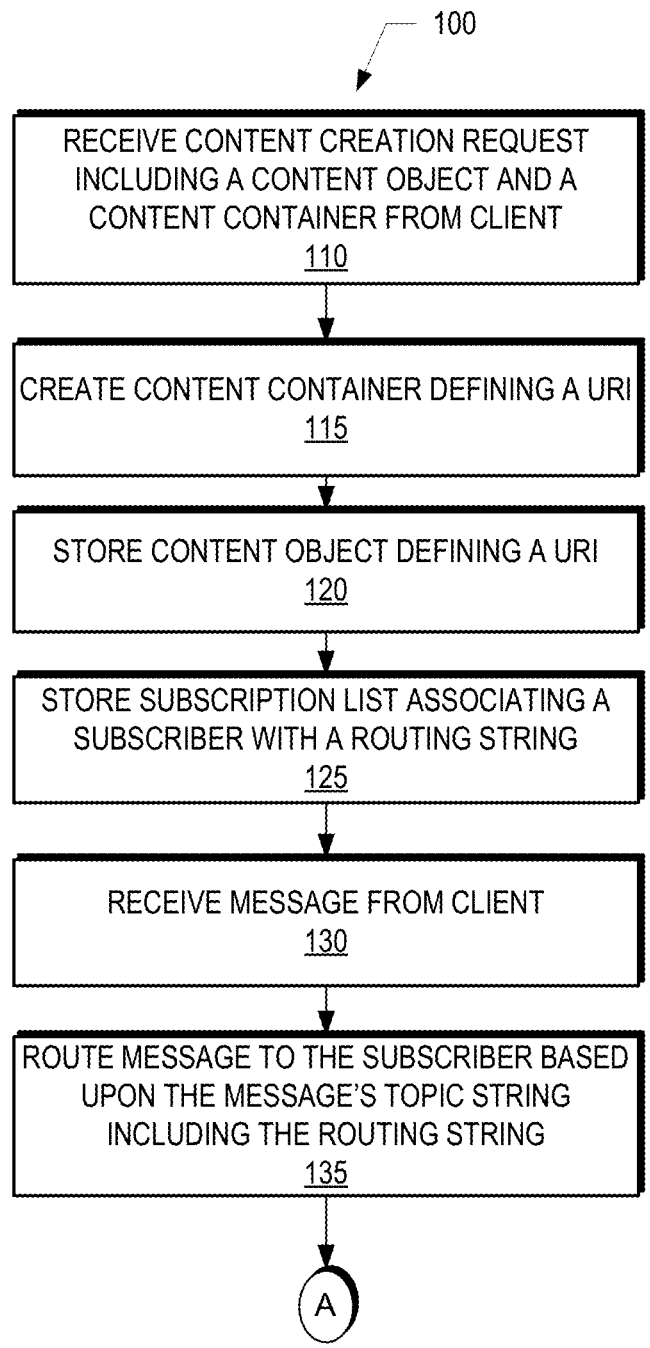
Figure 1B:
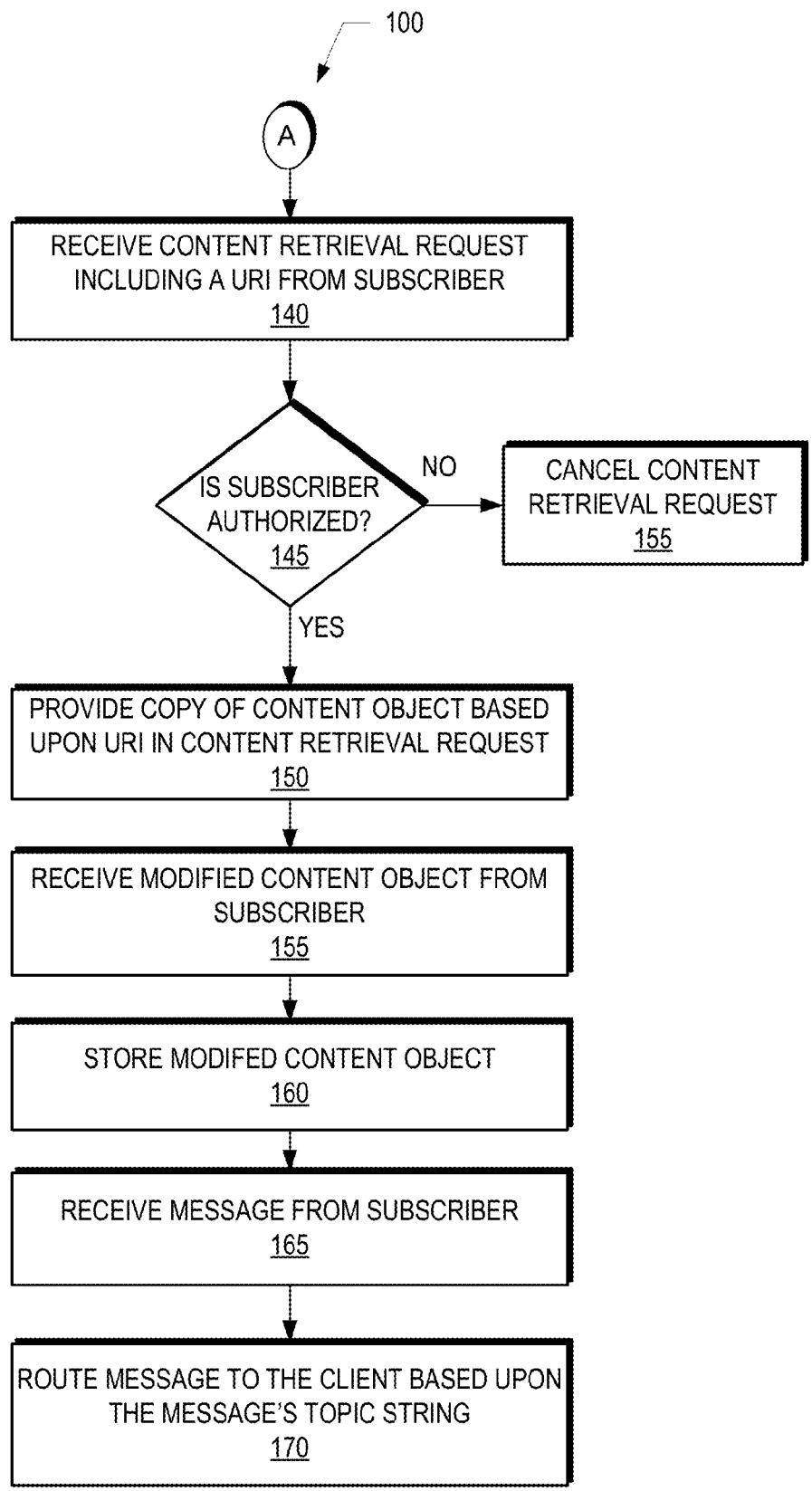
Figure 2:
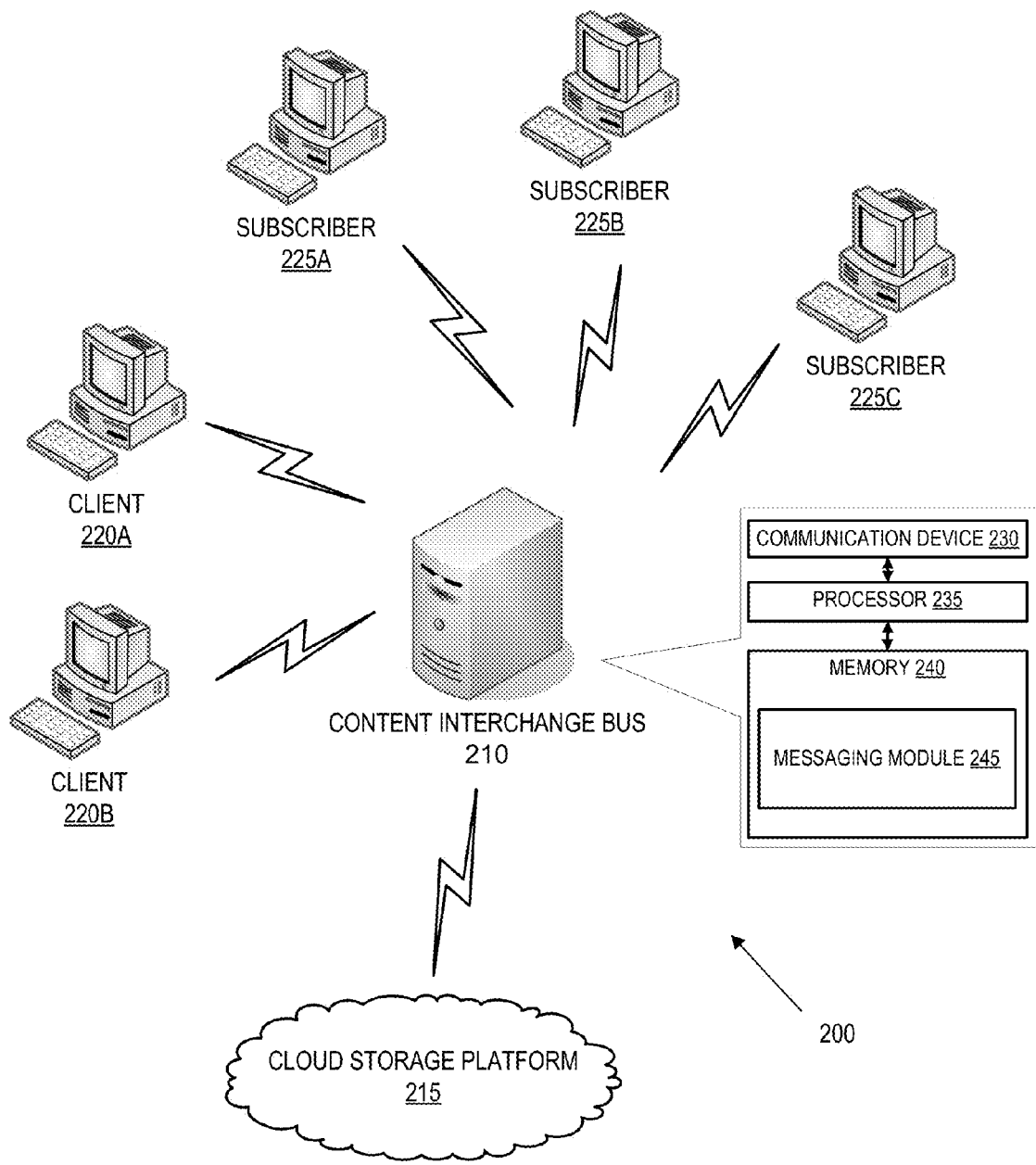
Figure 3A:
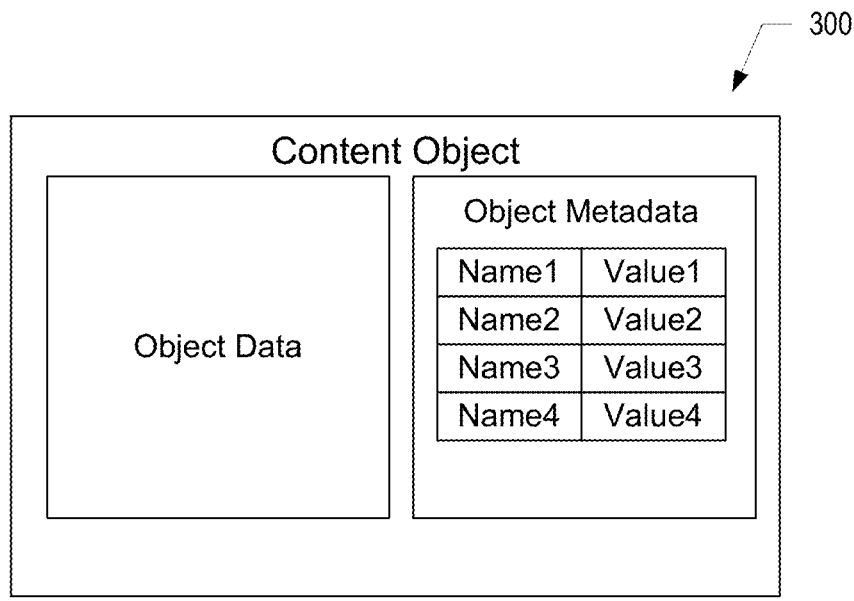
Figure 3B:
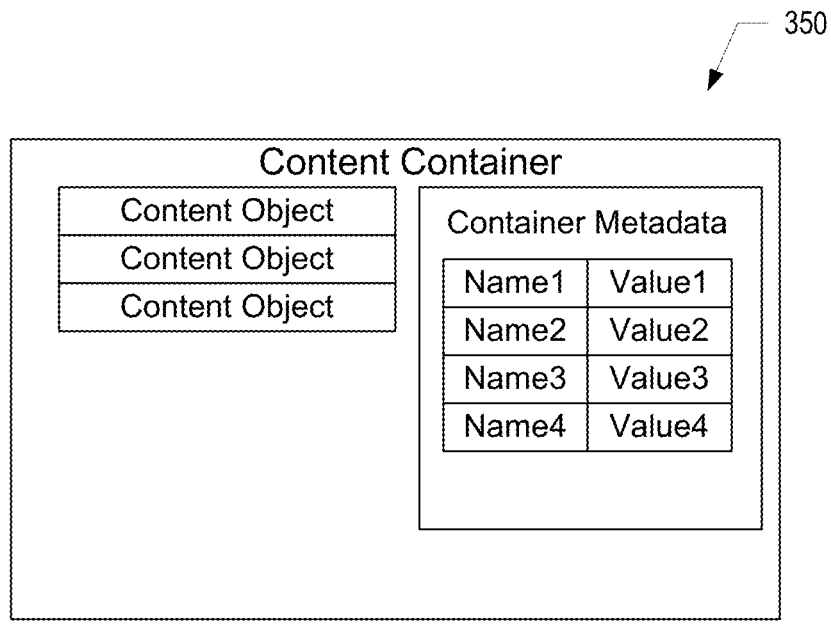

Having thus described embodiments of the invention in general terms, reference will now be made the accompanying drawings, wherein:

FIGS. 1A-1B depicts a method of exchanging content via messages in accordance with an exemplary embodiment of the present invention;

FIG. 2 depicts an exemplary system for exchanging content via messages in accordance with an exemplary embodiment of the present invention;

FIG. 3A depicts a logical view of a content object in accordance with an exemplary embodiment of the present invention; and FIG. 3B depicts a logical view of a content container in accordance with an exemplary embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the term "electronic data" as used herein includes any information electronically stored or produced. For example, electronic data may include, but is not limited to mechanical, facsimile, electronic, magnetic, digital or other programs (private, commercial, work-in-progress, etc.), programming notes, instructions, listings of electronic mail receipts, output resulting from the use of any software program, including word processing documents, spreadsheets, database files, charts, graphs and outlines, electronic mail or "e-mail," personal digital assistant ("PDA") messages, instant messenger messages, operating systems, source code of all types, programming languages, linkers and compilers, peripheral drives, PDF files, PRF files, batch files, ASCII files, crosswalks, code keys, pull down tables, logs, file layouts and any and all miscellaneous files or file fragments, deleted file or file fragment. Electronic data may also include any and all items stored on computer memory or memories, hard disks, floppy disks, zip drives, CD-ROM discs, Bernoulli Boxes and their equivalents, magnetic tapes of all types and kinds, microfiche, punched cards, punched tape, computer chips (including but not limited to EPROM, PROM, ROM and RAM of any kind) on or in any other vehicle for digital data storage or transmittal, files, folder tabs, or containers and labels appended to or associated with any physical storage device associated with each original and each copy.

Furthermore, embodiments of the present invention use the term "subscriber." It will be appreciated by someone with ordinary skill in the art that the user may be an individual, law firm, financial institution, government organization, corporation, or other entity that may wish to receive electronic data (e.g., electronic documents). Embodiments of the present invention also use the term "client" to describe a company, business, financial institution, individual, or other entity that wishes to distribute electronic data (e.g., electronic documents). For example, the client may be a financial institution desiring to distribute document relating to a loan application process. Clients and subscribers may be part of the same organization or different organizations.

In accordance with embodiments of the invention, the terms "financial institution" and "financial entity" include any organization that processes financial transactions including, but not limited to, banks, credit unions, savings and loan associations, investment companies, stock brokerages, assess management firms, insurance companies and the like. In specific embodiments of the invention, use of the term "bank" is limited to a financial entity in which account-bearing customers conduct financial transactions, such as account deposits, withdrawals, transfers and the like.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that wish to receive or distribute electronic data.

In one aspect, the present invention embraces a method of exchanging content via messages. In another aspect, the present invention embraces a system that can be used to exchange content via messages. In this regard, FIGS. 1A-1B depict a method 100 of exchanging content via messages in accordance with an exemplary embodiment of the present invention. Moreover, FIG. 2 depicts a system 200 for exchanging content via messages in accordance with an exemplary embodiment of the present invention. The system 200 for exchanging content via messages is typically configured to perform one or more steps of the method 100 of exchanging content via messages.

As depicted in FIG. 2, the system 200 typically includes a content interchange bus 210 that is in communication with a cloud storage platform 215. One or more clients 220A-220B and one or more subscribers 225A-225C are typically in communication with the content interchange bus 210.

As illustrated in FIG. 2, the content interchange bus 210 typically includes a communication device 230, a processor 235 (e.g., a processing device), and a memory 240 (e.g., a memory device). As used herein, the term "processor" generally includes circuitry used for implementing the communication and/or logic functions of the particular system. For example, the processor 235 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processor 235 is operatively coupled to the communication device 230 and the memory 240. The processor 235 uses the communication device 230 to communicate with the cloud storage platform 215 and with the one or more clients 220A-220B and one or more subscribers 225A-225C. As such, the communication device 230 generally includes a modem, server, or other device for communicating with the cloud storage platform 215 and with the one or more clients 220A-220B and one or more subscribers 225A-225C. Each client and subscriber may use any suitable device for communicating with the content interchange bus 210. For example, a client or subscriber may use a suitable communication device, including mobile devices, such as a cellular telecommunications device (e.g., a cell phone or mobile phone), personal digital assistant (PDA), a mobile Internet accessing device, or other user system including, but not limited to pagers, televisions, gaming devices, laptop computers, desktop computers, cameras, video recorders, audio/video player, radio, GPS devices, any combination of the aforementioned, or the like.

The content interchange bus 210 also typically includes a messaging module 245 stored in the memory 240 (e.g., in the form of computer-readable instructions stored in the memory 240). The messaging module 245 is typically configured to perform one or more steps of the method 100 depicted in FIG. 1.

The cloud storage platform 215 may allow for on-demand network access to a shared pool of content provided by clients and/or subscribers, in the form of cloud resources (e.g., networks, servers, storage, services, etc.). The network access may be a global area network (GAN), such as the Internet, a wide area network (WAN), a local area network (LAN), or any other type of network or combination of networks. The network may provide for wireline, wireless, or a combination wireline and wireless communication between devices on the network. The content may include structured and/or unstructured data that a client wishes to provide to one or more subscribers. The content may also include structured and/or unstructured data provided by one or more subscribers. The cloud storage platform 215 may support one or more protocols, such as web-based protocols (e.g., representational state transfer (REST) and web service (WS)) and traditional file system protocols (e.g., Network File System (NFS) and Common Internet File System (CIFS)), for uploading and downloading content.

Any suitable cloud storage platform may be employed. In this regard, the cloud storage platform 215 may take the form of several different models. These models may include, but are not limited to, the private model, public model, community model, and hybrid model. In some embodiments, the cloud storage platform 215 may be provided in a private model. The private model allows the cloud storage platform 215 to only be used only be a single entity. In some embodiments, the cloud storage platform 215 may be provided in a public model. The public model allows the cloud storage platform 215 to be available to the public or to multiple entities. In some embodiments, the cloud storage platform 215 may be provided in a community model. The community model allows the cloud storage platform 215 to be accessed and/or used by a group of related entities. In some embodiments, the cloud storage platform 215 may be provided in a hybrid model. In the hybrid model the cloud storage platform 215 may be used both publicly and privately based on the provider's requests.

In this regard, FIG. 2 depicts direct access to the cloud storage platform 215 being limited to the content interchange bus 210. In other words, the content interchange bus 210 may act as an intermediary between the cloud storage platform 215 and the clients 220A-220B and subscribers 225A-225C. That said, it within the scope of the present invention for the clients 220A-220B and subscribers 225A-225C to have direct access to the cloud storage platform 215.

As noted, FIGS. 1A-1B depict a method 100 of exchanging content via messages in accordance with an exemplary embodiment of the present invention.

In step 110, a content creation request is receiving from a client (e.g., from the first client 220A or the second client 220B). The content creation request may be received by the content interchange bus 210 or by the cloud storage platform 215. The content creation request includes a first content object. Alternatively, the content creation request may include a plurality of content objects.

Each content object typically includes data intended for distribution (e.g., to one or more subscribers), a first metadata name/value pair describing the first content object, and a second metadata name/value pair describing a first content container. The data may be any structured and/or unstructured data that the client wishes to distribute to one or more subscribers. For example, the data may be one or more electronic documents. The first metadata name/value pair describes the information contained in the data so that it can be understood and processed. In one embodiment, the first metadata name/value pair may allow for the data to be automatically understood and processed by a computing system (e.g., by a computing system operated by a subscriber). The second metadata name/value pair identifies a content container (e.g., a folder) to which the first content object is associated. Each content container may be associated with one or more content objects.

A logical view of an exemplary content object 300 is depicted in FIG. 3A. As depicted in FIG. 3A, the exemplary content object 300 includes object data, which is intended for distribution, and a plurality of metadata name/value pairs.

Based upon the needs of clients and subscribers, it is within the scope of the present invention for content objects to include additional metadata name/value pairs (e.g., as depicted in FIG. 3A). For example, in one embodiment, the first content object may include a third metadata name/value pair that describes a deletion tag. This deletion tag is typically set to a retain value, which indicates to the cloud storage platform that the first content object should be retained and not deleted. In the event that the deletion tag's value is changed to a delete value, the cloud storage platform will then typically schedule the first content object for deletion (e.g., to delete the content object after a predetermined period of time).

If a content object is intended to be accessed by a plurality of users (e.g., by a plurality of subscribers), then the content object may have a plurality of deletion tags (e.g., metadata value/pairs), each of which is each of which is associated with a particular user. Once a user-specific deletion tag has been set to a delete value, the user's permission to access the content object is removed instead of scheduling the content object for deletion. That said, once all of a content object's user-specific deletion tags have been set to a delete value, the content object may then be scheduled for deletion.

In one embodiment, the content interchange bus 210 and/or the cloud storage platform 215 may authenticate the identity of the client and determine whether the client is authorized to upload content. In this regard, any suitable way of authenticating the identity of the client and determining that the client is authorized is within the scope of the present invention. For example, the client may provide a username and password to establish authentication and authorization. The Security Assertion Markup Language (SAML) may be used to exchange authentication and authorization information (e.g., via tokens). In addition, a secured connection between a user and the content interchange bus 210 and/or the cloud storage platform 215 is typically provided to ensure a secure transmission channel (e.g., for a content object or content container).

If the first content container, which was identified in the first content object, has not yet been created, then, in step 115, the first content container is created in the cloud storage platform 215. If the first content container identified in the content object already exists, then this step may be skipped. In either case, the first content container typically defines a uniform resource identifier (URI), which indicates the location of the first content container in the cloud storage platform. In other words, the URI acts as a pointer to the location of the content container in the cloud storage platform. The first content container's URI may subsequently be used by a user (e.g., a client or a subscriber) to access the content container. Accordingly, each content container typically has a unique URI.

A logical view of an exemplary content container 350 is depicted in FIG. 3B. As depicted in FIG. 3B, the exemplary content container 350 includes one or more content objects. In one embodiment, instead of including the content objects themselves, the content container 350 may include a reference (e.g., a location pointer) to the content objects that are associated with the content container 350. The exemplary content container 350 also includes one or more metadata name/value pairs. For example, the content container may include a first metadata name/value pair describes the information (e.g., content objects) contained in the content container so that it can be understood and processed. The content container may also include a second metadata name/value pair that describes a deletion tag. This deletion tag is typically set to a retain value, which indicates to the cloud storage platform that the first content container should be retained and not deleted. In the event that the deletion tag's value is changed to a delete value, the cloud storage platform will then typically schedule the first content container and all of the content objects associated with the first content container for deletion.

In step 120, the first content object is stored in the cloud storage platform 215. Typically, the first content object is stored within the first content container (e.g., folder) identified in the first metadata name/value pair to which the first content object is associated. The first content object typically defines a uniform resource identifier (URI), which indicates the location of the first content object in the cloud storage platform. In other words, the URI acts as a pointer to the location of the first content object in the cloud storage platform. The content object's URI may subsequently be used by a user (e.g., a client or a subscriber) to access the content object. Accordingly, each content object typically has a unique URI.

In one embodiment, the cloud storage platform 215 may be configured to automatically delete content objects and/or content containers after a predetermined period of time (e.g., several months or years). Accordingly, content may not remain stored in cloud storage platform 215 indefinitely.

In step 125, one or more subscription lists are stored. In one embodiment, one or more subscription lists are stored in the cloud storage platform 215. Alternatively, one or more subscriptions lists may be stored in the memory 240 of the content interchange bus 210. Each subscription list includes one or more routing strings. Each routing string includes one or more characters, words, phrases, and/or the like to identify one or more users to which a particular message should be routed. Each subscription list also includes the identity and routing information for one or more users (e.g., one or more of the clients 220A-220B and the subscribers 225A-225C) associated with each routing string. By way of example, a subscription list may indicate that (i) a first subscriber 225A is associated with a first routing string, (ii) a the first subscriber 225A and a third subscriber 225C are associated with a second routing string, and (iii) the first client 220A is associated with a third routing string. In one embodiment, a client may upload a subscription list to the cloud storage platform 215 and/or to the content interchange bus 210. In another embodiment, a subscription list may be updated after a client sends a request to the content interchange bus to change a subscription list (e.g., to add a routing string, remove a routing string, add subscribers associated with a routing string, and/or remove subscribers associated with a routing string).

In step 130, a first message is received by the content interchange bus 210 from the client (e.g., from the first client 220A). The message may be automatically generated by the client (e.g., automatically generated by an application using a client computing device) or manually generated by the client. The message typically includes a topic string and a payload. The topic string in the message typically includes a routing string contained in a subscription list. The topic string may also include one or more action strings. Each action string is more or characters that can be recognized by the recipient(s) of the message. For example, the action string may be automatically recognized by a recipient application (e.g., a subscriber application) so that the application can automatically process (e.g., queue) the message. The payload of the message typically includes one or more uniform resource identifiers (URIs), where each URI corresponds to the location of a content object (e.g., the first content object) or a content container (e.g., the first content container) in the cloud storage platform 215. Because the first message includes a URI (e.g., a pointer) corresponding to the location of a content object or a content container in the cloud storage platform 215, the first message does not need to include a copy of the content object or the content container itself.

The content interchange bus 210 is typically able to send and receive any type of message that is suitable for use with the present invention. For example, the content interchange bus 210 may be capable of receiving instant messages.

To ensure that messages are authentic and only accessed by authorization user, the messages may employ public-key infrastructure (PKI). For example, authentication of a message sender and recipient (e.g., a client or a subscriber) may be provided through the user of digital certificates. In addition, public-key encryption may be used to ensure that the contents of a message can only be accessed by an authorized user.

Next, in step 135, the first message is routed (e.g., transmitted) to one or more users (e.g., one or more of the clients 220A-220B and the subscribers 225A-225C) by the content interchange bus 210 based upon the message's topic string. For example, the first message may be routed to a first subscriber. In order to route the first message, the content interchange bus determines if the message's topic string includes a routing string found in a subscription list. If the message's topic string includes a routing string found in a subscription list, the message is then transmitted to each user (e.g., the first subscriber) that is associated with that routing string in the subscription list.

If the message's topic string does not include a routing string found in a subscription list, the message is typically not routed to a user. Instead, an error message is transmitted to the sender of the message (e.g., the client). This error message indicates to the sender that the message could not be routed because its topic string does not include a valid routing string.

Subsequently, in step 140, a content retrieval request is received (e.g., by the content interchange bus 210 and/or the cloud storage platform 215) from a user (e.g., by the first subscriber). The content request may be automatically generated by a user during the processing of a received message (e.g., after recognizing an action string). The content retrieval request typically includes one or more uniform resource identifiers (URIs), where each URI corresponds to the location of a content object (e.g., the first content object) or a content container (e.g., the first content container) in the cloud storage platform 215. Typically, the URIs were previously provided to the user in a message (e.g., a message from a client and routed to the user by the content interchange bus 210).

In this regard, the content interchange bus 210 and/or the cloud storage platform 215 may be configured to determine if each URI contained in the content retrieval request is valid (i.e., corresponds to a content object or content container located in the cloud storage platform 215). If any URI is invalid, a notification indicating that one or more URIs is invalid may be transmitted to the user (e.g., subscriber) that sent the content retrieval request. This notification may be in the form of a message that is routed by the content interchange bus 210 using a subscription list.

In step 145, the content interchange bus 210 and/or the cloud storage platform 215 determines if the sender (e.g., the first subscriber) of the content retrieval request is authorized to access each content object and/or content container associated with each URI included in the content retrieval request. In this regard, any suitable way of authenticating the identity of the sender of the content retrieval request (e.g., the first subscriber) and determining that the sender of the content retrieval request is authorized is within the scope of the present invention. For example, the content interchange bus 210 and/or the cloud storage platform 215 may track which users are allowed access to which content objects and content containers (e.g., by employing subscription lists). The identity of the sender may then be compared against a list of users that are authorized to access each content object and content container referred to in the content retrieval request. The sender may provide a username and password to establish authentication and authorization.

If the sender of the content retrieval request is not authorized to access any content object and/or content container associated with the one or more URIs contained in the content retrieval request, then, in step 155, the content retrieval request may be canceled. In addition, a notification indicating that the content retrieval request has been canceled may be transmitted to the sender of the content retrieval request. This notification may be in the form of a message that is routed by the content interchange bus 210 using a subscription list.

If the sender of the content retrieval request is authorized to access some, but not all, of the content objects and/or content containers associated with the one or more URIs contained in the content retrieval request, then a notification indicating such may be transmitted to the sender of the content retrieval request. This notification may be in the form of a message that is routed by the content interchange bus 210 using a subscription list.

By determining if the sender of the content retrieval request is authorized, an unauthorized individual or entity who acquires the URI for a content object or content container will not be able to gain access to that content object or content container without the permission to do so.

In step 150, for each content object URI in the content retrieval request, a copy of that content object associated with that content object URI is transmitted (e.g., using a secure transmission channel) to the sender (e.g., to a sender application) of the content retrieval request if the sender is authorized to access that content object. In addition, for each content container URI in the content retrieval request, a copy of the content container associated with that content container URI, including a copy of each content object associated with the content container, is transmitted to the sender (e.g., the first subscriber) if the sender is authorized to access that content container. By providing a copy of content objects and content containers instead of direct access, asynchronous access to the same content objects and/or content containers can be provided to a plurality of users (e.g., subscribers and clients).

After receiving a copy of the content object or content container, the sender of the content retrieval request may then automatically process the content object or content container. An action string in a message that triggered the content retrieval request may aid a sender application in knowing how to process data in the content object or content container.

Although a copy of one or more content objects is typically provided to an authorized sender of a content retrieval request, the sender is typically unable to alter or modify a content object or content container that is stored in the cloud storage platform 215. That said, it is within the scope of the present invention for the content retrieval request to include a deletion request related to one or more content objects or content containers. If the content retrieval request includes a deletion request, then the deletion tag (i.e., the third metadata name/value pair) for each content object and content container referred to in the deletion request may be set to a deletion value. Subsequently, the cloud storage platform may delete each content object and content container based upon the deletion tag being set to a deletion value. Accordingly, a subscriber or a client may be able delete a content object and/or content container once it is no longer needed. That said, in the event that a content object or content container has a plurality of user-specific deletion tags, setting a deletion tag specific to a particular user to a deletion value will instead have the effect of removing that user's permission to access the content object. Once all of a content object's or content container's user-specific deletion tags have been set to a delete value, the content object or content container may then be scheduled for deletion.

In some embodiments, a subscriber may wish to provide a modified version of a content object or a new content object to another user (e.g., to the client that uploaded the original content object to the cloud storage platform). For example, the subscriber may wish to modify an electronic document uploaded by a client or provided a new electronic document to the client. By way of further example, a subscriber application may automatically wish to upload a modified version of a content object or a new content object generated after processing a content object. Accordingly, in step 155, the content interchange bus 210 or the cloud storage platform 215 may receive (e.g., using a secure transmission channel) a new or modified content object from the subscriber (e.g., in the form of content creation request). The new or modified content object typically includes data intended for distribution, a first metadata name/value pair describing the new or modified content object, and a second metadata name/value pair describing a content container. The first metadata name/value pair describes the information contained in the data so that it can be understood and processed. The second metadata name/value pair identifies a content container (e.g., a folder) to which the content object is associated. For a modified content object, the second metadata name/value pair will typically identify the same content container as the original version of the content object.

In step 160, the new or modified content object is stored in the cloud storage platform 215. Typically, the new or modified content object is stored within the content container (e.g., folder) identified in the first metadata name/value pair to which the content object is associated. The content object defines a uniform resource identifier (URI), which indicates the location of the content object in the cloud storage platform. For a modified content object, the URI will typically differ from the URI of the original content object.

In step 165, a message is received by the content interchange bus 210 from the subscriber. The message typically includes a topic string and a payload. The topic string in the message typically includes a routing string contained in a subscription list. The payload of the message typically includes one or more uniform resource identifiers (URI), where each URI may corresponds to the location of the new or modified content object provided by the subscriber. The message may be automatically generated by the subscriber (e.g., automatically generated by a subscriber computing device) or manually generated by the subscriber.

In step 170, the message is routed (e.g., transmitted) to one or more users (e.g., one or more of the clients 220A-220B and the subscribers 225A-225C) by the content interchange bus 210 based upon the message's topic string. In order to route the message, the content interchange bus determines if the message's topic string includes a routing string found in a subscription list. If the message's topic string includes a routing string found in a subscription list, the message is then transmitted to each user (e.g., client) that is associated with that routing string in the subscription list.

If the message's topic string does not include a routing string found in a subscription list, the message is typically not routed to a user. Instead, an error message is transmitted to the sender of the message (e.g., a client). This error message indicates to the sender that the message could not be routed because its topic string does not include a valid routing string.

In one embodiment, the content interchange bus 210 is configured to track the state of messages (e.g., messages sent by a client or sent by a subscriber) that it routes. For example, the content interchange bus 210 may track whether a message has been successfully sent and received by the intended recipient. In addition, the content interchange bus 210 may track whether copies of the content objects and/or content containers having their associated URIs included in a message have been provided to the message's recipient(s). Furthermore, the content interchange bus 210 may track whether any of these steps have failed (e.g., there was an error in sending the message, the message was not successfully delivered to one or more recipients, or a recipient failed to request a copy of a content object or content container within a predefined period of time). The state of a message may then be provided by the content interchange bus 210 in a notification to the sender of the message. This notification may be in the form of a message that is routed by the content interchange bus 210 using a subscription list. Accordingly, the sender (e.g., a client or a subscriber) of the message can have notice of an error that occurs in message transmission. In addition, the sender can be able to know whether a copy of a content object or content container has been retrieved.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for exchanging content via messages, comprising:
   a content interchange bus including a processor and a memory;
   a messaging module stored in the memory, executable by the processor and configured for:
      receiving a first content creation request from a client, the first content creation request comprising a first content object that includes (i) data intended for distribution, wherein the data includes an electronic document, (ii) a first metadata name/value pair describing the first content object, (iii) a second metadata name/value pair describing a first content container and (iv) a plurality of user-specific deletion tags, wherein each user-specific deletion tag is associated with a particular subscriber, the user-specific deletion tags including a first user-specific deletion tag associated with a first subscriber;
      creating the first content container in a cloud storage platform, the first content container defining a uniform resource identifier indicating its location in the cloud storage platform;
      storing the first content object in the cloud storage platform, the first content object defining a uniform resource identifier indicating its location in the cloud storage platform;
      storing a subscription list, the subscription list associating the first subscriber with a first routing string;
      receiving a first message from the client, a payload of the first message comprising the first content container's uniform resource identifier or the first content object's uniform resource identifier, the message comprising a topic string that includes the first routing string;
      routing the first message to the first subscriber based on the topic string including the first routing string;
      receiving a first content retrieval request from the first subscriber, the first content retrieval request comprising the first content container's uniform resource identifier or the first content object's uniform resource identifier;
      determining that the first subscriber is authorized to access the first content container or the first content object;
      providing a copy of the first content object to the first subscriber based upon (i) the first content retrieval request comprising the first content container's uniform resource identifier or the first content object's uniform resource identifier and (ii) determining that the first subscriber is authorized to access the first content container or the first content object;
      determine that the first subscriber has retrieved the copy of the first content object;
      communicate a notification to a sender of the first content object based on determining that the first subscriber retrieved the copy of the first content object; and
      receiving a deletion request to set one or more of the user-specific deletion tags to a delete value and, based on the deletion request, setting one of more of the user-specific deletion tags to a delete value, wherein (i), once the first user-specific deletion tags has been set to a delete value, permission of the first subscriber to access the first content object is removed, and (ii), once all of the user-specific deletion tags have been set to a delete value, the first content object is deleted, wherein the first content object is not deleted until all the user-specific deletion tags have been set to a delete value.

2. The system according to claim 1, wherein:
   the subscription list associates the first subscriber and a second subscriber with the first routing string; and
   routing the first message comprises routing the first message to the first subscriber and to the second subscriber based on the topic string including the first routing string.

3. The system according to claim 1, wherein the messaging module is configured for:
   receiving a second content creation request from a client, the second content creation request comprising a second content object that includes (i) data intended for distribution, (ii) a first metadata name/value pair describing the second content object, and (iii) a second metadata name/value pair describing the first content container; and
   storing the second content object in the cloud storage platform, the second content object defining a uniform resource identifier indicating its location in the cloud storage platform.

4. The system according to claim 3, wherein:
   the first message comprises the first content container's uniform resource identifier;
   the first content retrieval request comprises the first content container's uniform resource identifier; and
   providing comprises providing the copy of the first content object and a copy of the second content object based upon the first content retrieval request comprising the first content container's uniform resource identifier.

5. The system according to claim 3, wherein:
   the first message comprises the second content container's uniform resource identifier;
   the first content retrieval request comprises the second content container's uniform resource identifier; and
   the messaging module is configured for providing a copy of the second content object based upon the first content retrieval request comprising the second content object's uniform resource identifier.

6. The system according to claim 1, wherein the client is a financial institution and the electronic document is a loan document.

7. The system according to claim 1, wherein the messaging module is configured for:
   receiving a modified version of the electronic document from the first subscriber; and
   based on receiving the modified version of the electronic document, storing a second content object in the cloud storage platform, wherein the second content object includes (i) data intended for distribution, wherein the data includes the modified version of the electronic document, (ii) a first metadata name/value pair describing the second content object, and (iii) a second metadata name/value pair describing the first content container, wherein the second content object defines a uniform resource identifier indicating its location in the cloud storage platform.

8. The system according to claim 1, wherein the messaging module is configured for:
tracking whether a copy of the first content object has been provided to the first subscriber; and
based on tracking whether a copy of the first content object has been provided to the first subscriber, providing a notification to the client of whether a copy of the first content object has been provided to the first subscriber.

9. A computer program product for exchanging content via messages, comprising a non-transitory computer-readable storage medium having computer-executable instructions for:
receiving a first content creation request from a client, the first content creation request comprising a first content object that includes (i) data intended for distribution, wherein the data includes an electronic document, (ii) a first metadata name/value pair describing the first content object, (iii) a second metadata name/value pair describing a first content container and (iv) a plurality of user-specific deletion tags, wherein each user-specific deletion tag is associated with a particular subscriber, the user-specific deletion tags including a first user-specific deletion tag associated with a first subscriber;
creating the first content container in a cloud storage platform, the first content container defining a uniform resource identifier indicating its location in the cloud storage platform;
storing the first content object in the cloud storage platform, the first content object defining a uniform resource identifier indicating its location in the cloud storage platform;
storing a subscription list, the subscription list associating the first subscriber with a first routing string;
receiving a first message from the client, a payload of the first message comprising the first content container's uniform resource identifier or the first content object's uniform resource identifier, the message comprising a topic string that includes the first routing string;
routing the first message to the first subscriber based on the topic string including the first routing string;
receiving a first content retrieval request from the first subscriber, the first content retrieval request comprising the first content container's uniform resource identifier or the first content object's uniform resource identifier;
determining that the first subscriber is authorized to access the first content container or the first content object;
providing a copy of the first content object to the first subscriber based upon (i) the first content retrieval request comprising the first content container's uniform resource identifier or the first content object's uniform resource identifier and (ii) determining that the first subscriber is authorized to access the first content container or the first content object;
determining that the first subscriber has retrieved the copy of the first content object;
communicating a notification to a sender of the first content object based on determining that the first subscriber retrieved the copy of the first content object; and
receiving a deletion request to set one or more of the user-specific deletion tags to a delete value and, based on the deletion request, setting one of more of the user-specific deletion tags to a delete value, wherein (i), once the first user-specific deletion tags has been set to a delete value, permission of the first subscriber to access the first content object is removed, and (ii), once all of the user-specific deletion tags have been set to a delete value, the first content object is deleted, wherein the first content object is not deleted until all the user-specific deletion tags have been set to a delete value.

10. The computer program product according to claim 9, wherein:
the subscription list associates the first subscriber and a second subscriber with the first routing string; and
routing the first message comprises routing the first message to the first subscriber and to the second subscriber based on the topic string including the first routing string.

11. The computer program product according to claim 9, wherein the non-transitory computer-readable storage medium has computer-executable instructions for:
receiving a second content creation request from a client, the second content creation request comprising a second content object that includes (i) data intended for distribution, (ii) a first metadata name/value pair describing the second content object, and (iii) a second metadata name/value pair describing the first content container; and
storing the second content object in the cloud storage platform, the second content object defining a uniform resource identifier indicating its location in the cloud storage platform.

12. The computer program product according to claim 11, wherein:
the first message comprises the first content container's uniform resource identifier;
the first content retrieval request comprises the first content container's uniform resource identifier; and
providing comprises providing the copy of the first content object and a copy of the second content object based upon the first content retrieval request comprising the first content container's uniform resource identifier.

13. The computer program product according to claim 11, wherein:
the first message comprises the second content container's uniform resource identifier;
the first content retrieval request comprises the second content container's uniform resource identifier; and
the non-transitory computer-readable storage medium has computer-executable instructions for providing a copy of the second content object based upon the first content retrieval request comprising the second content object's uniform resource identifier.

14. The computer program product according to claim 9, wherein the client is a financial institution and the electronic document is a loan document.

15. The computer program product according to claim 9, wherein the non-transitory computer-readable storage medium has computer-executable instructions for:
receiving a modified version of the electronic document from the first subscriber; and
based on receiving the modified version of the electronic document, storing a second content object in the cloud storage platform, wherein the second content object includes (i) data intended for distribution, wherein the data includes the modified version of the electronic document, (ii) a first metadata name/value pair describing the second content object, and (iii) a second metadata name/value pair describing the first content container, wherein the second content object defines a uniform resource identifier indicating its location in the cloud storage platform.

16. The computer program product according to claim 9, wherein the non-transitory computer-readable storage medium has computer-executable instructions for:
    tracking whether a copy of the first content object has been provided to the first subscriber; and
    based on tracking whether a copy of the first content object has been provided to the first subscriber, providing a notification to the client of whether a copy of the first content object has been provided to the first subscriber.

17. A method of exchanging content via messages, comprising:
    receiving, using a processor, a first content creation request from a client, the first content creation request comprising a first content object that includes (i) data intended for distribution, wherein the data includes an electronic document, (ii) a first metadata name/value pair describing the first content object, (iii) a second metadata name/value pair describing a first content container and (iv) a plurality of user-specific deletion tags, wherein each user-specific deletion tag is associated with a particular subscriber, the user-specific deletion tags including a first user-specific deletion tag associated with a first subscriber;
    creating, using a processor, the first content container in a cloud storage platform, the first content container defining a uniform resource identifier indicating its location in the cloud storage platform;
    storing, using a processor, the first content object in the cloud storage platform, the first content object defining a uniform resource identifier indicating its location in the cloud storage platform;
    storing, using a processor, a subscription list, the subscription list associating the first subscriber with a first routing string;
    receiving, using a processor, a first message from the client, a payload of the first message comprising the first content container's uniform resource identifier or the first content object's uniform resource identifier, the message comprising a topic string that includes the first routing string;
    routing, using a processor, the first message to the first subscriber based partially on the topic string including the first routing string;
    receiving, using a processor, a first content retrieval request from the first subscriber, the first content retrieval request comprising the first content container's uniform resource identifier or the first content object's uniform resource identifier;
    determining, using a processor, that the first subscriber is authorized to access the first content container or the first content object; providing, using a processor, a copy of the first content object to the first subscriber based upon (i) the first content retrieval request comprising the first content container's uniform resource identifier or the first content object's uniform resource identifier and (ii) determining that the first subscriber is authorized to access the first content container or the first content object;
    determining, using a processor, that the first subscriber has retrieved the copy of the first content object;
    communicating, using a processor, a notification to a sender of the first content object based on determining that the first subscriber retrieved the copy of the first content object; and
    receiving, using processor, a deletion request to set one or more of the user-specific deletion tags to a delete value and, based on the deletion request, setting one of more of the user-specific deletion tags to a delete value, wherein (i), once the first user-specific deletion tags has been set to a delete value, permission of the first subscriber to access the first content object is removed, and (ii), once all of the user-specific deletion tags have been set to a delete value, the first content object is deleted, wherein the first content object is not deleted until all the user-specific deletion tags have been set to a delete value.

18. The method according to claim 17, wherein:
    the subscription list associates the first subscriber and a second subscriber with the first routing string; and
    routing the first message comprises routing the first message to the first subscriber and to the second subscriber based on the topic string including the first routing string.

19. The method according to claim 17, wherein the messaging module is configured for:
    receiving a second content creation request from a client, the second content creation request comprising a second content object that includes (i) data intended for distribution, (ii) a first metadata name/value pair describing the second content object, and (iii) a second metadata name/value pair describing the first content container; and
    storing the second content object in the cloud storage platform, the second content object defining a uniform resource identifier indicating its location in the cloud storage platform.

20. The method according to claim 19, wherein
    the first message comprises the first content container's uniform resource identifier;
    the first content retrieval request comprises the first content container's uniform resource identifier; and
    providing comprises providing the copy of the first content object and a copy of the second content object based upon the first content retrieval request comprising the first content container's uniform resource identifier.

21. The method according to claim 19, wherein:
    the first message comprises the second content container's uniform resource identifier;
    the first content retrieval request comprises the second content container's uniform resource identifier; and
    the method further comprises providing a copy of the second content object based upon the first content retrieval request comprising the second content object's uniform resource identifier.

* * * * *